United States Patent
Bonnet

[11] 3,799,150
[45] Mar. 26, 1974

[54] ENDOSCOPES

[76] Inventor: Ludwig Bonnet, 28 Johnstrasse, Knittlingen, Germany

[22] Filed: Dec. 2, 1971

[21] Appl. No.: 204,249

[30] Foreign Application Priority Data
Dec. 5, 1970   Germany............................ 7045081

[52] U.S. Cl. ................................................. 128/6
[51] Int. Cl................................................ A61b 1/06
[58] Field of Search............. 128/4, 5, 6, 7, 8, 9, 10, 128/11

[56] References Cited
UNITED STATES PATENTS
3,297,022   1/1967   Wallace .................................. 128/6
3,643,653   2/1972   Takahashi et al....................... 128/6

*Primary Examiner*—Lucie H. Laudenslager

[57] ABSTRACT

This invention relates to endoscopes of the kind having a stem that provides a free view of and allows illumination for an area of examination of a body cavity. The object of the invention is to provide an endoscope that is of particular use for examining narrow body cavities so that a direct view can be obtained without the necessity of using an optical system extending through the endoscope stem. In the invention, this stem is of oval cross-section and is provided with a viewing tube eccentrically positioned therein and a sickle-shaped area is defined between the stem and viewing tube. The stem encloses a fibre light conductor comprising a bundle of light-transmitting fibres and a semi-cylindrical light radiator of optical glass is mounted on the distal end of the viewing tube. This member has a semi-cylindrical surface in a thickened head portion of the stem and is located in front of the distal end of the stem and viewing tube: moreover, it has a flat surface which is directed towards the longitudinal axis of the viewing tube.

1 Claim, 3 Drawing Figures

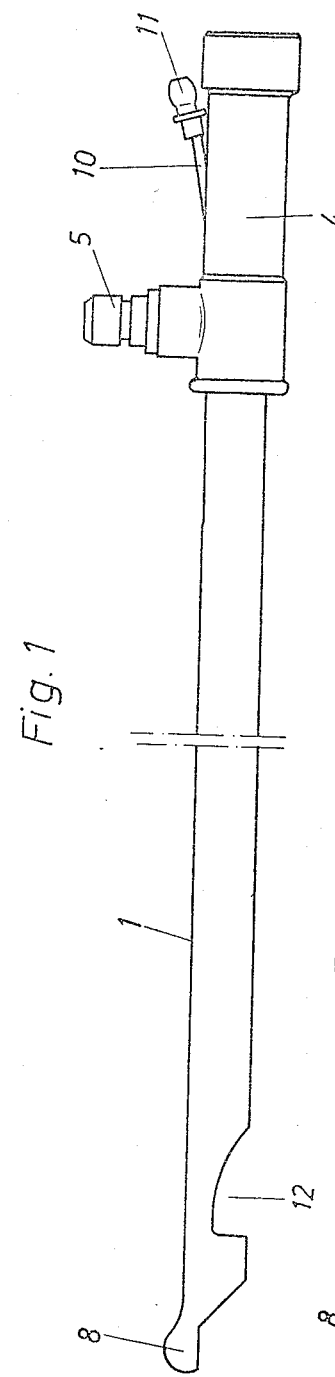
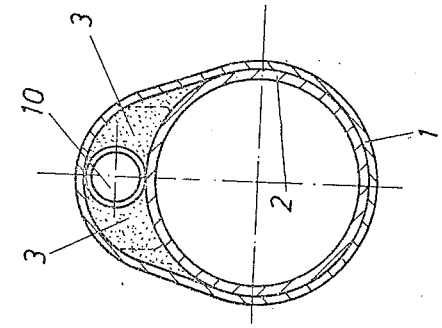
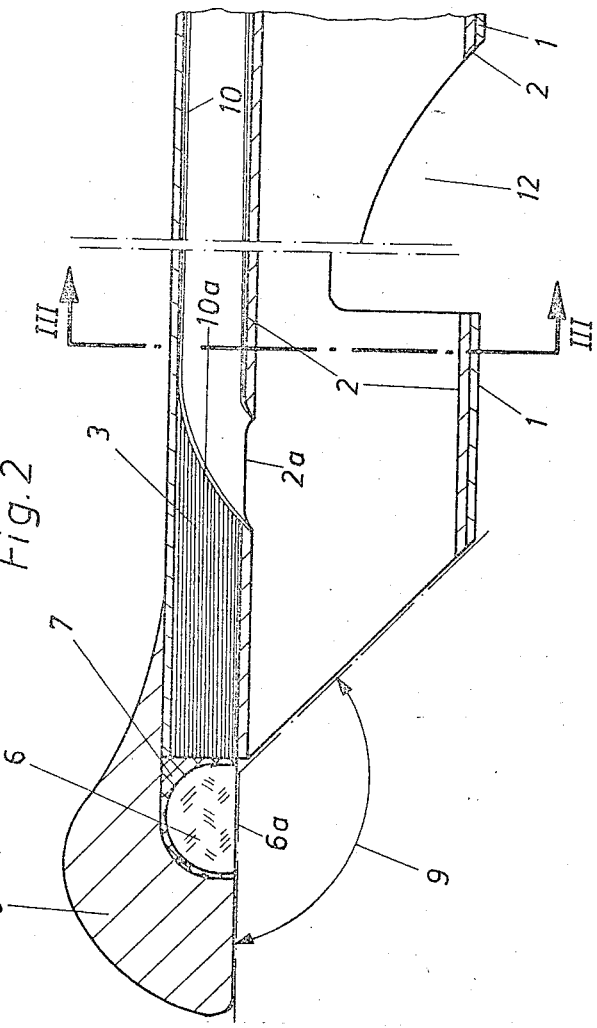
Fig. 1
Fig. 2
Fig. 3

3,799,150

ENDOSCOPES

The present invention relates to an endoscope having a stem providing a free view of and illumination for an area of examination of a body cavity. In such endoscopes illumination of the area of examination is effected by means of a light bulb or an annular fibre light conductor, comprising a bundle of optical fibres, extending through the endoscope stem which can be attached to a light projector, the latter type of illumination leading to greater brightness of light and thus to better examination with direct viewing through the stem. Such endoscopes are often referred to as rectoscopes for examining the rectum.

Such direct viewing endoscopes, if necessary, having an optical system mounted on the proximal end of the stem, have hitherto not been usable for examining body cavities of small diameter, for example for examining the urethra, so that for this purpose an optical system having a line of vision of 170° was fed through the stem which has an appropriately small diameter. Due to the extremely small distance of the object from the lens, such examinations of the urethra must be regarded as unsatisfactory.

It is an object of the invention to provide an endoscope, more particularly for examining narrow body cavities, so that a direct view can be effected completely satisfactorily without an optical system extending through the stem.

In carrying this and other objects into effect, the invention accordingly consists in an endoscope comprising a stem to provide free viewing access to and illumination of an area of examination, said stem being at least approximately of oval cross-section and being provided internally with a viewing tube eccentrically positioned therein, with a substantially sickle-shaped area being defined between said stem and said viewing tube, said stem enclosing a fibre light conductor that extends through said sickle-shaped area, and a semi-cylindrical light-radiating member of optical glass mounted on the distal end of said viewing tube at right angles to the longitudinal direction of said light conductor, said light-radiating member having a semi-cylindrical surface surrounded by a thickened head portion of said stem and being positioned in front of the distal end of said stem and viewing tube, and having a flat surface directed towards the longitudinal axis of said viewing tube.

The invention enables efficient illumination of an area under examination to be achieved by means of the random intensive light passed through the light conductor and with direct view through the viewing tube, whereby satisfactory examination and estimation of the body cavity, more particularly the urethra, is obtained.

In order that the invention may be more clearly understood, reference will now be made to the accompanying drawings showing one embodiment thereof by way of example, and in which:

FIG. 1 shows a side view of an endoscope according to the innovation,

FIG. 2 shows an enlarged longitudinal section through the distal end of the endoscope according to FIG. 1, and FIG. 3 shows a cross-section along the line III—III of FIG. 2.

Referring now to the drawings, the endoscope of the embodiment illustrated advantageously consists of a stem 1, which is oval or approximately oval in cross-section, and through which extends a viewing tube 2 which is eccentrically positioned therein. This tube 2 for example may conform approximately to half the periphery on the inner wall of the stem. A bundle of light-conducting fibres 3, herein referred to as a fibre light conductor, extends through a sickle-shaped space formed between the stem 1 and viewing tube 2, apart from the sharp corners of the sickle-shaped space which are filled with cement, said conductor ending at the proximal end in a terminal rotary part 4 of circular cross-section mounted in a lateral stub 5 to which a light conductor leading to a light projector can be coupled. The fibre light conductor 3 ends at the distal end with an approximately oval cross-section in front of a semi-cylindrical light-radiating member 6 made from optical glass, arranged at right angles to the longitudinal direction of the fibre light conductor, the longer oval axis of said light conductor being parallel to the member 6 and a flat mattlower surface 6a of the latter which is directed towards the axis of the viewing tube 2. The stem 1 and the viewing tube 2 are cut away obliquely adjacent the radiating member 6. The semi-cylindrical periphery of the light-radiating member 6 is polished and connected both to the distal end of the fibre light conductor 3 and also to a thickened head portion 8 of the stem 1 beyond the viewing area, by means of a filling 7 of a suitable transparent cement.

The radiating member 6 distributes the light passed through the fibre light conductor 3 in a highly diffused manner so that the whole observation area 9 located in front of the stem is illuminated to the best advantage, so that the user, viewing directly through the tube 2, obtains satisfactory observation and estimation of the body cavity in question, e.g. the urethra. It is, of course, also possible, if desired, to fit an optical system to the proximal end of the stem 1.

In order to be able to pass surgical instruments such as probes, swabs, forceps or the like, to the parts of the body cavity to be examined, a small thin pipe 10 extends through the sickle-shaped area between the stem 1 and the tube 2, to emerge proximally from the rotary part 4 and terminates in an olive 11 on to which a rubber cap is slidable in order to seal the endoscope. The small thin tube 10 is enclosed by the fibre light conductor 3 and opens out in front of the distal end of the light conductor 3 with a curve 10a into a gap 2a in the wall of the tube 2 so that the surgical instruments, etc. can be brought into the area of the observation field.

It is possible with an endoscope according to the invention to connect a further rotary part to the rotary part 4 which is provided with a small glass closure plate for viewing and a side washing duct with a sealed connection to a washing device as well as a connecting member to which a vacuum pump can be joined. In the latter event, the stem 1 and the viewing tube 2 are provided in front of the distal end with a cut-out portion 12 through which the wall of the body cavity is sucked and can be operated upon, e.g. by cutting, using a blade (not shown).

I claim:

1. An endoscope comprising, in combination: a rigid stem elongated axially and having at least approximately ovel cross-sectional shape and provided with an enclosed space; a viewing-tube element provided within the enclosed space and extending longitudinally linearly therein providing free-viewing access to an area of endoscopic examination and having opposite proximal and distal ends, cross-sectionally the tube element being positioned eccentrically within the stem enclosed space such that a sickle-shaped space is defined between inner walls of the stem and outer walls of the viewing-tube element; fiber light conductor providable of illumination of an area of endoscopic examination, enclosed within and extending axially through said sickle-shaped area; and a light-deflecting prism of semi-cylindrical shape mounted behind the distal end of the viewing tube element at about right angle to the longitudinal direction of light being emitted from the light conductor, the light-deflecting prism being of a shape produceable of wide angle light illumination in a lateral direction upon receipt of light from a direction at about right-angle to the lateral direction, the light-deflecting prism having a flat surface exposed laterally through which radiated light is emitted, with the flat surface being about parallel to the longitudinal axis of the viewing-tube element; and a thin tube in said sickle-shaped space, said fiber light conductor at least partially surrounding the thin tube, said thin tube being arranged for the insertion therethrough of surgical instruments and the viewing tube element having at about its distal end in a lateral wall thereof a port defined therein defining a through passage to space external to the viewing tube element and to the stem, and said thin tube opening through said port laterally.

* * * * *